United States Patent
Takayama et al.

(10) Patent No.: US 11,611,306 B2
(45) Date of Patent: Mar. 21, 2023

(54) MOTOR DRIVING APPARATUS, ELECTRIC BLOWER, VACUUM CLEANER, AND HAND DRYER

(71) Applicant: Mitsubishi Electric Corporation, Tokyo (JP)

(72) Inventors: Yuji Takayama, Tokyo (JP); Haruka Matsuo, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 52 days.

(21) Appl. No.: 17/431,335

(22) PCT Filed: Apr. 11, 2019

(86) PCT No.: PCT/JP2019/015854
§ 371 (c)(1),
(2) Date: Aug. 16, 2021

(87) PCT Pub. No.: WO2020/208788
PCT Pub. Date: Oct. 15, 2020

(65) Prior Publication Data
US 2022/0131492 A1    Apr. 28, 2022

(51) Int. Cl.
 *H02P 27/08* (2006.01)
 *H02K 7/14* (2006.01)
 *H02P 25/04* (2006.01)

(52) U.S. Cl.
 CPC .............. *H02P 27/08* (2013.01); *H02K 7/14* (2013.01); *H02P 25/04* (2013.01)

(58) Field of Classification Search
 CPC .. H02P 27/08; H02P 25/04; H02P 6/20; H02P 1/02; H02P 8/04; H02P 9/08; H02K 7/14
 See application file for complete search history.

(56) References Cited

U.S. PATENT DOCUMENTS

| | | |
|---|---|---|
| 2013/0234631 A1 | 9/2013 | Bateman |
| 2014/0111127 A1* | 4/2014 | Bi .............................. H02P 6/20 318/400.11 |

FOREIGN PATENT DOCUMENTS

| | | |
|---|---|---|
| JP | H01-308192 A | 12/1989 |
| JP | 2006-020498 A | 1/2006 |
| JP | 2014-511103 A | 5/2014 |
| JP | 2018-014886 A | 1/2018 |
| WO | 2017/077574 A1 | 5/2017 |
| WO | 2018/073869 A1 | 4/2018 |

OTHER PUBLICATIONS

International Search Report dated Jun. 4, 2019, issued in corresponding International Application No. PCT/JP2019/015854 (and English Machine Translation).

* cited by examiner

*Primary Examiner* — Said Bouziane
(74) *Attorney, Agent, or Firm* — Posz Law Group, PLC

(57) ABSTRACT

A motor driving apparatus for driving a single-phase motor includes an inverter disposed between a battery and the single-phase motor, the inverter applying a first voltage to the single-phase motor at startup and applying a second voltage to the single-phase motor during a normal operation. A stop time period is present after application of the first voltage, application of the first voltage being stopped during the stop time period, and the inverter applies the second voltage after a lapse of the stop time period.

22 Claims, 14 Drawing Sheets

MOTOR DRIVING APPARATUS, ELECTRIC BLOWER, VACUUM CLEANER, AND HAND DRYER

CROSS REFERENCE TO RELATED APPLICATION

This application is a U.S. National Stage Application of International Application No. PCT/JP2019/015854, filed on Apr. 11, 2019, the contents of which are incorporated herein by reference.

FIELD

The present invention relates to a motor driving apparatus for driving a single-phase motor, and to an electric blower, a vacuum cleaner, and a hand dryer equipped with a single-phase motor that is driven by the motor driving apparatus.

BACKGROUND

There is a conventional method of position sensorless startup of a multi-phase brushless motor in which a high frequency voltage is applied such that the motor rotates following the rotating magnetic field generated by the inverter. In addition, Patent Literature 1 below discloses a startup method for a three-phase sensorless brushless motor in which the initial position of the rotor is set through one energization, the rotation speed of the rotor is increased based on the set initial position, and the position of the rotor is detected after the rotation speed is increased.

CITATION LIST

Patent Literature

Patent Literature 1: Japanese Patent Application Laid-open No. H1-308192

SUMMARY

Technical Problem

As described above, various startup methods have been proposed for multi-phase motors. On the other hand, in the case of single-phase motors, it is not possible to generate a rotating magnetic field using an inverter. Therefore, it is general practice to separate startup control and normal control and switch from startup control to normal control while the rotor is rotating.

However, if an appropriate voltage that depends on the rotor magnetic pole position is not applied during switching from startup control to normal control, a steep current may be generated and damage the single-phase motor. In addition, if a steep current flows during switching, the overcurrent cutoff function may be activated to stop the single-phase motor. Therefore, concerning the position sensorless startup of a single-phase motor, there is a demand for safe and reliable startup.

The present invention has been made in view of the above, and an object thereof is to obtain a motor driving apparatus capable of activating a single-phase motor safely and reliably in the case of position sensorless startup of the single-phase motor.

Solution to Problem

In order to solve the above-mentioned problems and achieve the object, the present invention is a motor driving apparatus for driving a single-phase motor. The motor driving apparatus includes an inverter disposed between a direct-current power supply and the single-phase motor, the inverter applying a first voltage to the single-phase motor at startup and applying a second voltage to the single-phase motor during a normal operation. A stop time period is present after application of the first voltage, application of the first voltage being stopped during the stop time period. The inverter applies the second voltage after a lapse of the stop time period.

Advantageous Effects of Invention

The motor driving apparatus according to the present invention can achieve the effect of activating the single-phase motor safely and reliably in the case of position sensorless startup of the single-phase motor.

DESCRIPTION OF EMBODIMENTS

Hereinafter, a motor driving apparatus, an electric blower, a vacuum cleaner, and a hand dryer according to embodiments of the present invention will be described in detail with reference to the drawings. The present invention is not limited to the following embodiments.

Embodiment

Figure 1:
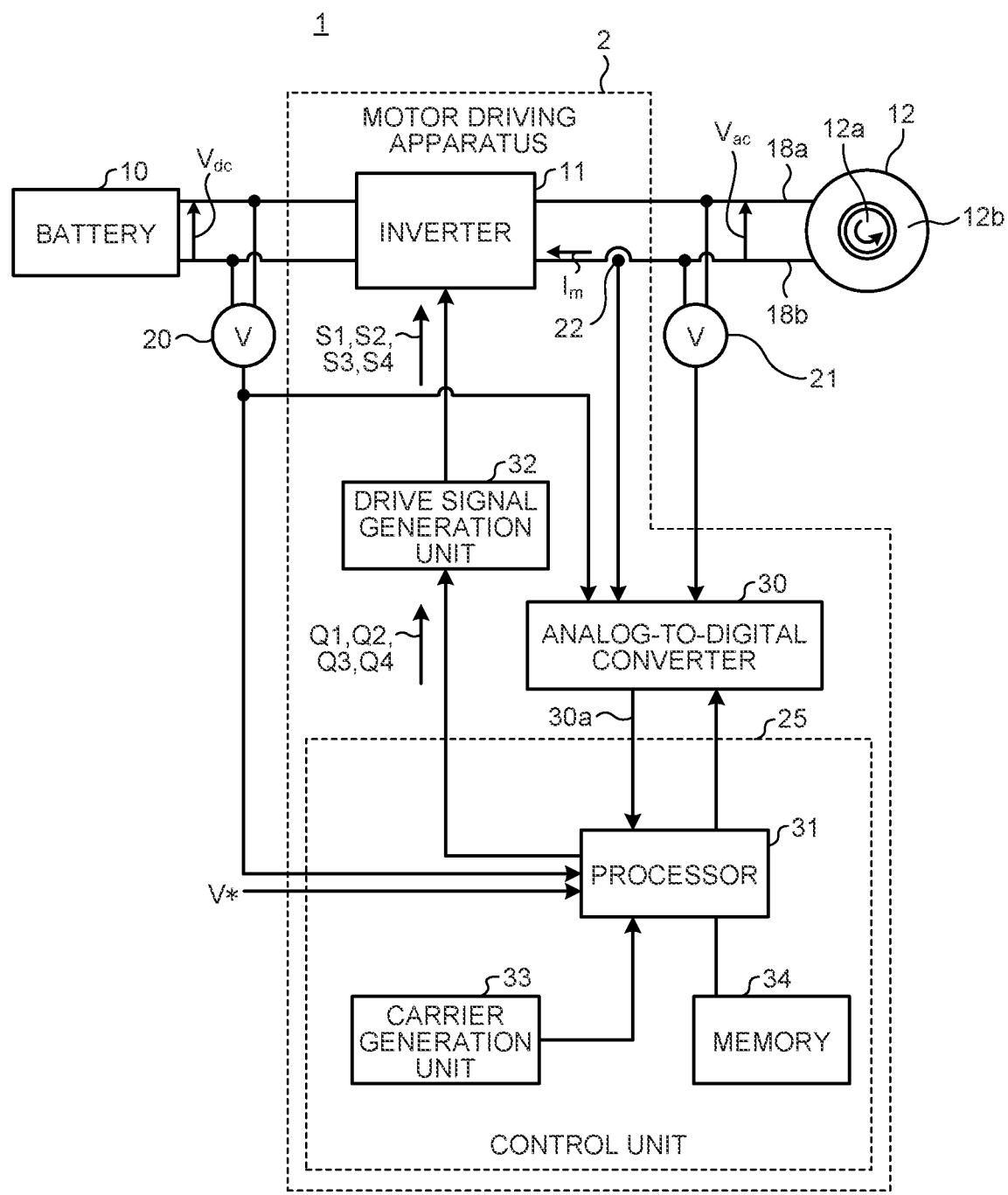
FIG. 1 is a block diagram illustrating the configuration of a motor driving system including a motor driving apparatus according to an embodiment.

FIG. 1 is a block diagram illustrating the configuration of a motor driving system 1 including a motor driving apparatus 2 according to an embodiment. The motor driving system 1 illustrated in FIG. 1 includes a single-phase motor 12, the motor driving apparatus 2, and a battery 10. The motor driving apparatus 2 is a driving apparatus that supplies alternating-current power to the single-phase motor 12 to drive the single-phase motor 12. The battery 10 is a direct-current power supply that supplies direct-current power to the motor driving apparatus 2.

The motor driving apparatus 2 includes an inverter 11, an analog-to-digital converter 30, a control unit 25, and a drive signal generation unit 32. The inverter 11 and the single-phase motor 12 are connected by two connection lines 18a and 18b.

The motor driving system 1 includes voltage detectors 20 and 21 and a current detector 22. The motor driving system 1 is what is called a position sensorless driving system, in which position sensor signals for detecting the rotational position of a rotor 12a are not used.

The voltage detector 20 is a detector that detects a direct-current voltage $V_{dc}$ output from the battery 10 to the motor driving apparatus 2. The direct-current voltage $V_{dc}$ is the output voltage of the battery 10 and is the applied voltage to the inverter 11.

The voltage detector 21 is a detector that detects an alternating-current voltage $V_{ac}$ generated between the connection lines 18a and 18b. The alternating-current voltage $V_{ac}$ is a voltage in which the motor applied voltage applied by the inverter 11 to the single-phase motor 12 and the motor induced voltage induced by the single-phase motor 12 are superimposed. When the operation of the inverter 11 is stopped and the single-phase motor 12 is rotating, the motor induced voltage is observed. In this specification, the state in which the operation of the inverter 11 is stopped and the inverter 11 is not outputting a voltage is referred to as "gate-off". In addition, the voltage output by the inverter 11 may be referred to as the "inverter output voltage".

The current detector 22 is a detector that detects a motor current $I_m$. The motor current $I_m$ is an alternating current supplied from the inverter 11 to the single-phase motor 12. The motor current $I_m$ is equal to the alternating current flowing in the winding (not illustrated in FIG. 1) wound around a stator 12b of the single-phase motor 12. The current detector 22 can be exemplified by a current detector that detects a current using a current transformer (CT) or a shunt resistor.

The single-phase motor 12 is used as a rotary electric machine for rotating an electric blower (not illustrated). The electric blower is installed on devices such as vacuum cleaners and hand dryers.

The inverter 11 is a power converter that converts the direct-current voltage $V_{dc}$ applied from the battery 10 into an alternating-current voltage. The inverter 11 supplies alternating-current power to the single-phase motor 12 by applying the alternating-current voltage obtained through conversion to the single-phase motor 12.

The analog-to-digital converter 30 is a signal converter that converts analog data into digital data. The analog-to-digital converter 30 converts the detected value of the direct-current voltage $V_{dc}$ detected by the voltage detector 20 and a detected value of the alternating-current voltage $V_{ac}$ detected by the voltage detector 21 into digital data and outputs the digital data to the control unit 25. In addition, the analog-to-digital converter 30 converts the detected value of the motor current $I_m$ detected by the current detector 22 into digital data and outputs the digital data to the control unit 25.

The control unit 25 generates PWM signals Q1, Q2, Q3, and Q4 (hereinafter denoted by "Q1 to Q4" as appropriate) based on a digital output value 30a obtained through conversion in the analog-to-digital converter 30 and a voltage amplitude command V*. The voltage amplitude command V* will be described later.

The drive signal generation unit 32 generates drive signals S1, S2, S3, and S4 (hereinafter denoted by "S1 to S4" as appropriate) for driving the switching elements in the inverter 11 based on the PWM signals Q1 to Q4 output from the control unit 25.

The control unit 25 includes a processor 31, a carrier generation unit 33, and a memory 34. The processor 31 generates the PWM signals Q1 to Q4 for performing PWM control. The processor 31 is a processing unit that performs various computations related to PWM control and lead angle control. The processor 31 can be exemplified by a central processing unit (CPU), a microprocessor, a microcontroller, a microcomputer, a digital signal processor (DSP), or a system large scale integration (LSI).

The memory 34 stores a program that is read by the processor 31. The memory 34 is also used as a work area when the processor 31 performs computation processing. The memory 34 is typically a non-volatile or volatile semiconductor memory such as a random access memory (RAM), a flash memory, an erasable programmable ROM (EPROM), or an electrically EPROM (EEPROM, registered trademark). Details of the configuration of the carrier generation unit 33 will be described later.

Figure 2:
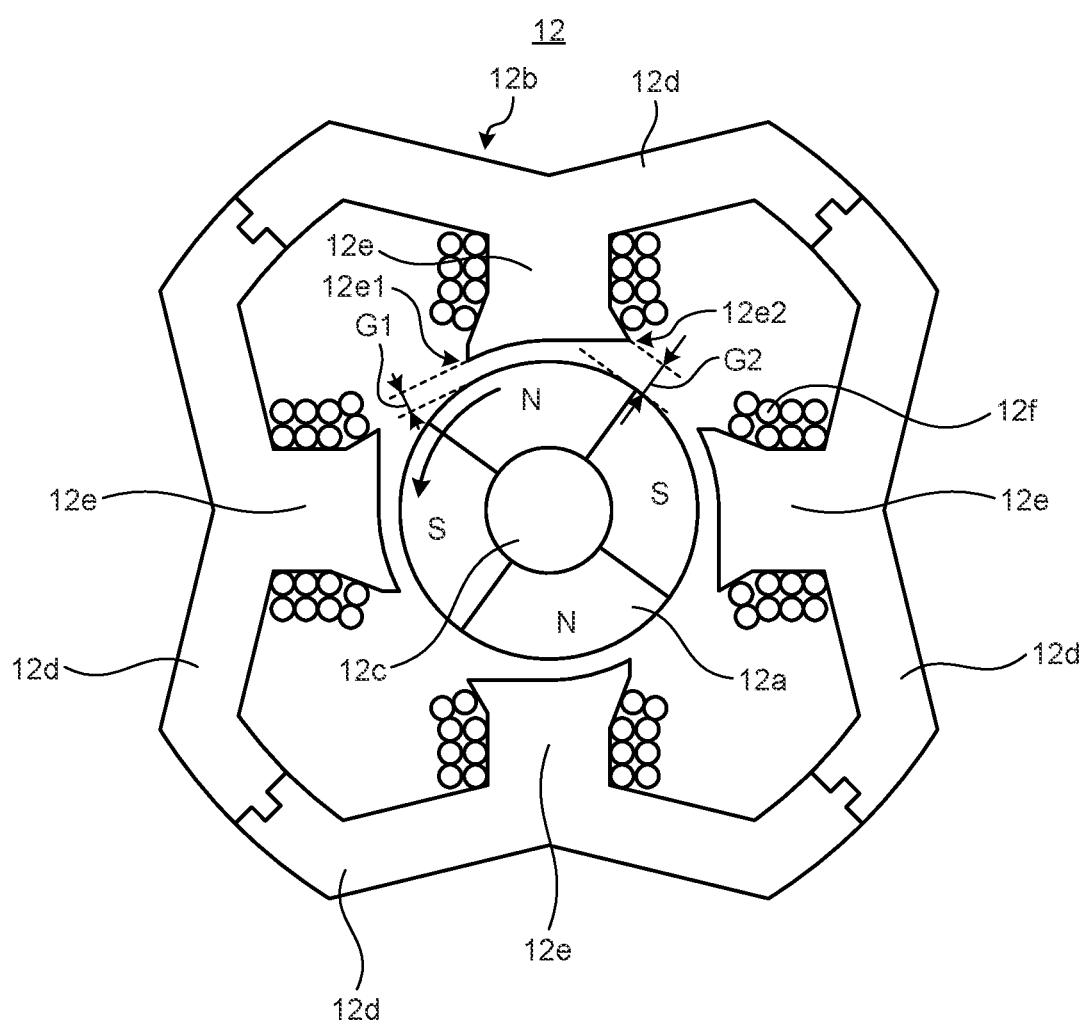
FIG. 2 is a cross-sectional view for explaining the structure of a single-phase motor according to the embodiment.

FIG. 2 is a cross-sectional view for explaining the structure of the single-phase motor 12 according to the embodiment. FIG. 2 depicts the cross-sectional shape of the rotor 12a and the stator 12b of a single-phase permanent magnet brushless motor as an example of the single-phase motor 12 used in the embodiment.

The rotor 12a is fit on a shaft 12c and is configured to be rotatable in the direction of the arrow illustrated, i.e., counterclockwise. Four permanent magnets are arranged in the circumferential direction on the rotor 12a. These four permanent magnets are disposed such that the magnetizing directions are alternately reversed in the circumferential direction, and form magnetic poles on the rotor 12a. Although the number of magnetic poles of the rotor 12a is four in the present embodiment as an example, the number of magnetic poles of the rotor 12a may be other than four.

The stator 12b is disposed around the rotor 12a. The stator 12b includes four divided cores 12d connected in an annular shape.

The divided cores 12d include asymmetric teeth 12e. A winding 12f is wound around the teeth 12e. The teeth 12e each have a first end portion 12e1 and a second end portion 12e2 protruding toward the rotor 12a. With respect to the rotation direction, the first end portion 12e1 is located ahead in the rotation direction, and the second end portion 12e2 is located behind in the rotation direction. Here, the distance between the first end portion 12e1 and the rotor 12a is referred to as the "first gap" and is denoted by G1. The distance between the second end portion 12e2 and the rotor 12a is referred to as the "second gap" and is denoted by G2. There is a relationship of G1<G2 between the first gap G1 and the second gap G2.

Figure 3:
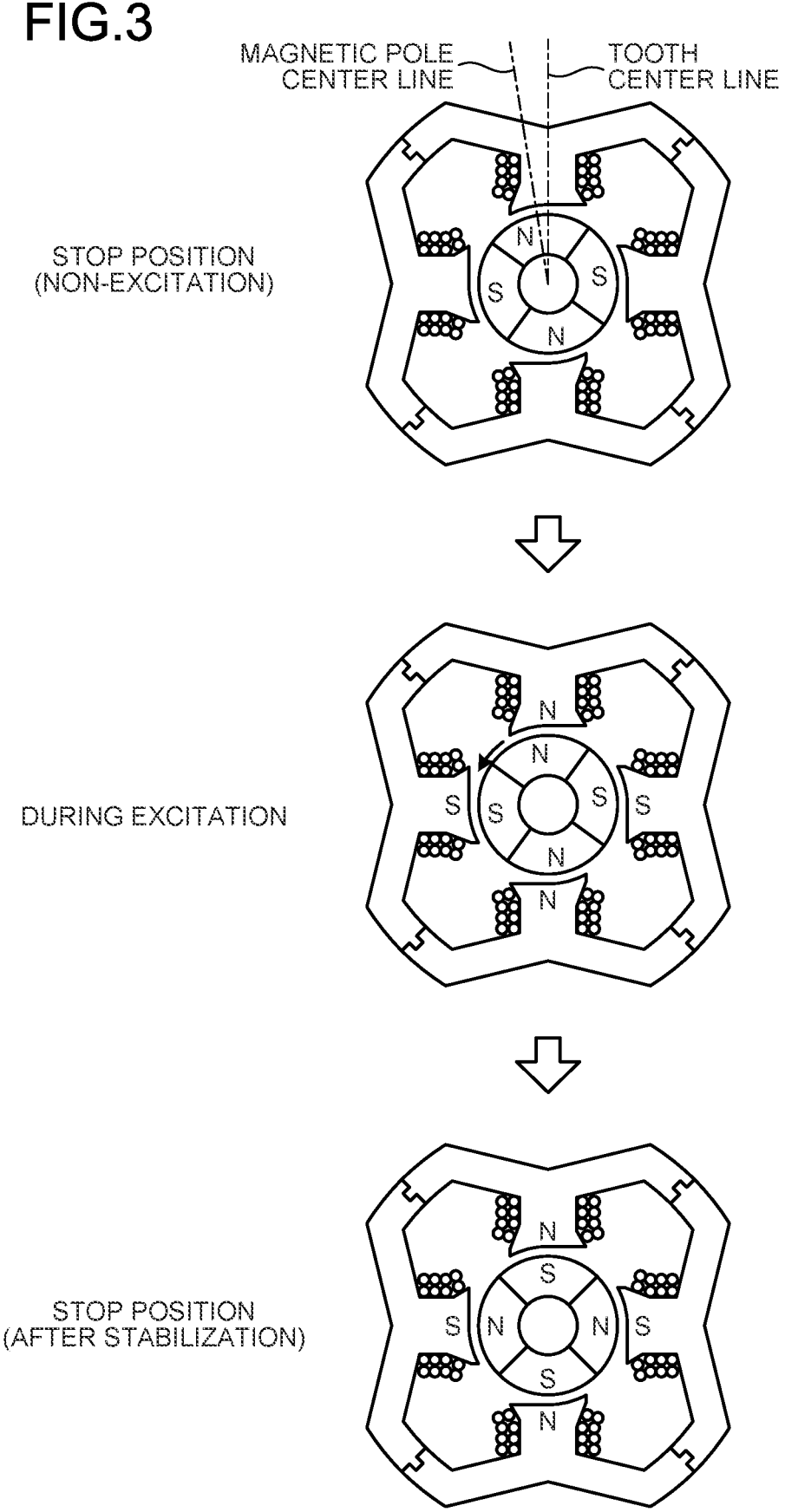
FIG. 3 is a diagram illustrating changes in rotor position in the case that the single-phase motor illustrated in FIG. 2 is excited.
Figure 4:
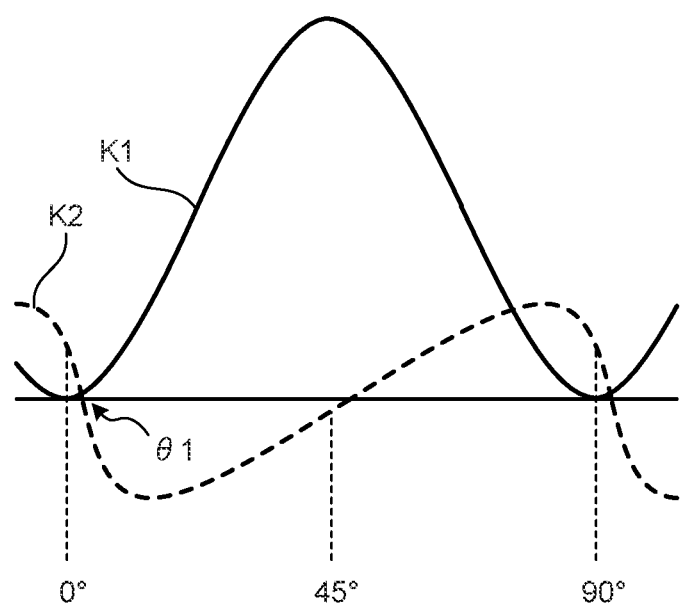
FIG. 4 is a diagram illustrating torque characteristics of the single-phase motor illustrated in FIG. 2.

FIG. 3 is a diagram illustrating changes in rotor position in the case that the single-phase motor 12 illustrated in FIG. 2 is excited. FIG. 4 is a diagram illustrating torque characteristics of the single-phase motor 12 illustrated in FIG. 2. The upper part of FIG. 3 depicts a stop position of the rotor 12a. At the stop position of the rotor 12a, a magnetic pole center line representing the center of a magnetic pole and a tooth center line representing the structural center are not aligned: the magnetic pole center line precedes in the rotation direction. This occurs because the single-phase motor 12 is structured to include the asymmetric teeth 12e. With this structure, the torque characteristics illustrated in FIG. 4 appear.

In FIG. 4, the curve K1 indicated by the solid line represents motor torque, and the curve K2 indicated by the broken line represents cogging torque. The motor torque is the torque generated in the rotor 12a due to the current flowing in the winding of the stator 12b. The cogging torque is the torque generated in the rotor 12a due to the magnetic force of the permanent magnets when no current is flowing in the winding of the stator 12b. Let the counterclockwise direction represent positive torque. The horizontal axis of FIG. 4 represents mechanical angle, and the stop position of the rotor 12a at which the magnetic pole center line is aligned with the tooth center line is a mechanical angle of 0°. As illustrated in FIG. 4, the cogging torque at the mechanical angle of 0° is positive. Therefore, the rotor 12a rotates counterclockwise and stops at the position of the mechanical angle θ1, where the cogging torque is zero. The position of this mechanical angle θ1 is the stop position illustrated in the upper part of FIG. 3.

In the case of the single-phase motor 12 illustrated in FIG. 2, the rotor 12a has two stop positions. One of the stop positions is the stop position illustrated in the upper part of FIG. 3 as described above, and the other is the stop position illustrated in the lower part of FIG. 3. The application of a direct-current voltage to the winding 12f causes the rotor 12a to rotate counterclockwise, and then the rotor 12a goes through the state during excitation illustrated in the middle part of FIG. 3 and stops in the state illustrated in the lower part of FIG. 3. In the case of the example of FIG. 3, because the magnetic forces generated in the teeth 12e due to the application of the direct-current voltage have the same polarity as the facing magnetic poles of the rotor 12a, torque is applied in the rotation direction and the rotor 12a rotates. Then, after a certain period of time elapses, a stable stop is achieved at the position of the lower part of FIG. 3, where the magnetic forces generated in the teeth 12e and the facing magnetic poles of the rotor 12a have different polarities.

Figure 5:
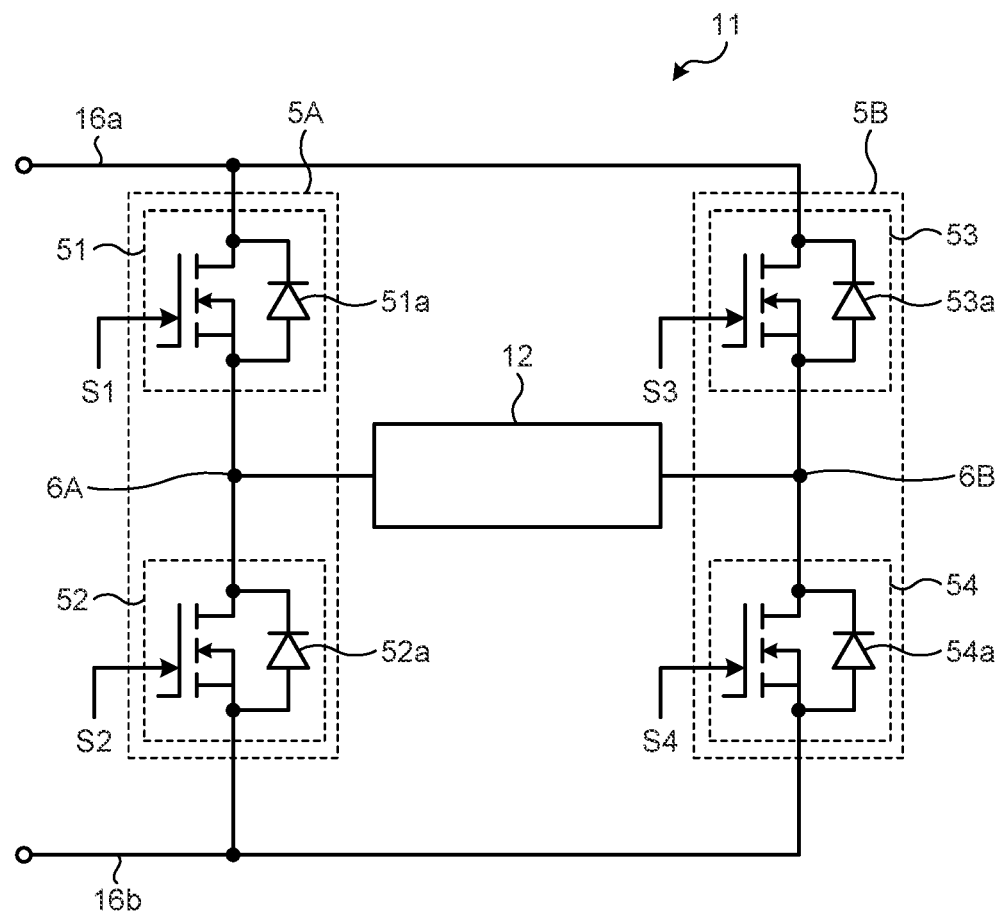
FIG. 5 is a circuit diagram illustrating the inverter illustrated in FIG. 1.

FIG. 5 is a circuit diagram illustrating the inverter 11 illustrated in FIG. 1. The inverter 11 includes a plurality of switching elements 51, 52, 53, and 54 (hereinafter denoted by "51 to 54" as appropriate) that are bridge-connected.

The switching elements 51 and 52 constitute a leg 5A, which is the first leg. The leg 5A is a series circuit in which the switching element 51, which is the first switching element, and the switching element 52, which is the second switching element, are connected in series to each other.

The switching elements 53 and 54 constitute a leg 5B, which is the second leg. The leg 5B is a series circuit in which the switching element 53, which is the third switching element, and the switching element 54, which is the fourth switching element, are connected in series to each other.

The legs 5A and 5B are connected in parallel to each other between a direct-current bus 16a on the high potential side and a direct-current bus 16b on the low potential side. Thus, the legs 5A and 5B are connected in parallel to the two ends of the battery 10.

The switching elements 51 and 53 are located on the high potential side, and the switching elements 52 and 54 are located on the low potential side. Generally, in an inverter circuit, the high potential side is referred to as an "upper arm" and the low potential side is referred to as a "lower arm". Thus, the switching element 51 of the leg 5A may be referred to as the "first switching element of the upper arm", and the switching element 52 of the leg 5A may be referred to as the "second switching element of the lower arm". Similarly, the switching element 53 of the leg 5B may be referred to as the "third switching element of the upper arm", and the switching element 54 of the leg 5B may be referred to as the "fourth switching element of the lower arm".

A connection end 6A between the switching element 51 and the switching element 52 and a connection end 6B between the switching element 53 and the switching element 54 constitute an alternating-current end of the bridge circuit. The single-phase motor 12 is connected between the connection end 6A and the connection end 6B.

An example of each of the switching elements 51 to 54 is a metal-oxide-semiconductor field-effect transistor (MOSFET). A MOSFET is an example of a field-effect transistor (FET).

In the switching element 51, a body diode 51a connected in parallel between the drain and source of the switching element 51 is formed. In the switching element 52, a body diode 52a connected in parallel between the drain and source of the switching element 52 is formed. In the switching element 53, a body diode 53a connected in parallel between the drain and source of the switching element 53 is formed. In the switching element 54, a body diode 54a connected in parallel between the drain and source of the switching element 54 is formed. Each of the plurality of body diodes 51a, 52a, 53a, and 54a is a parasitic diode formed inside the MOSFET, and is used as a freewheeling diode. Note that a separate freewheeling diode may be connected. Instead of MOSFETs, insulated gate bipolar transistors (IGBTs) may be used.

The switching elements 51 to 54 are not limited to MOSFETs formed of a silicon-based material, but may be MOSFETs formed of a wide bandgap (WBG) semiconductor such as silicon carbide, gallium nitride, gallium oxide, or diamond.

In general, WBG semiconductors have higher withstand voltage and heat resistance than silicon semiconductors. Therefore, by using a WBG semiconductor for at least one of the plurality of switching elements 51 to 54, the withstand voltage property and allowable current density of the switching elements are increased, which can contribute to reducing the size of the semiconductor module incorporating the switching elements. WBG semiconductors also have high heat resistance. This can contribute to reducing the size of the heat dissipation part for dissipating heat generated by the semiconductor module. This can also contribute to simplifying the heat dissipation structure that dissipates heat generated by the semiconductor module.

Figure 6:
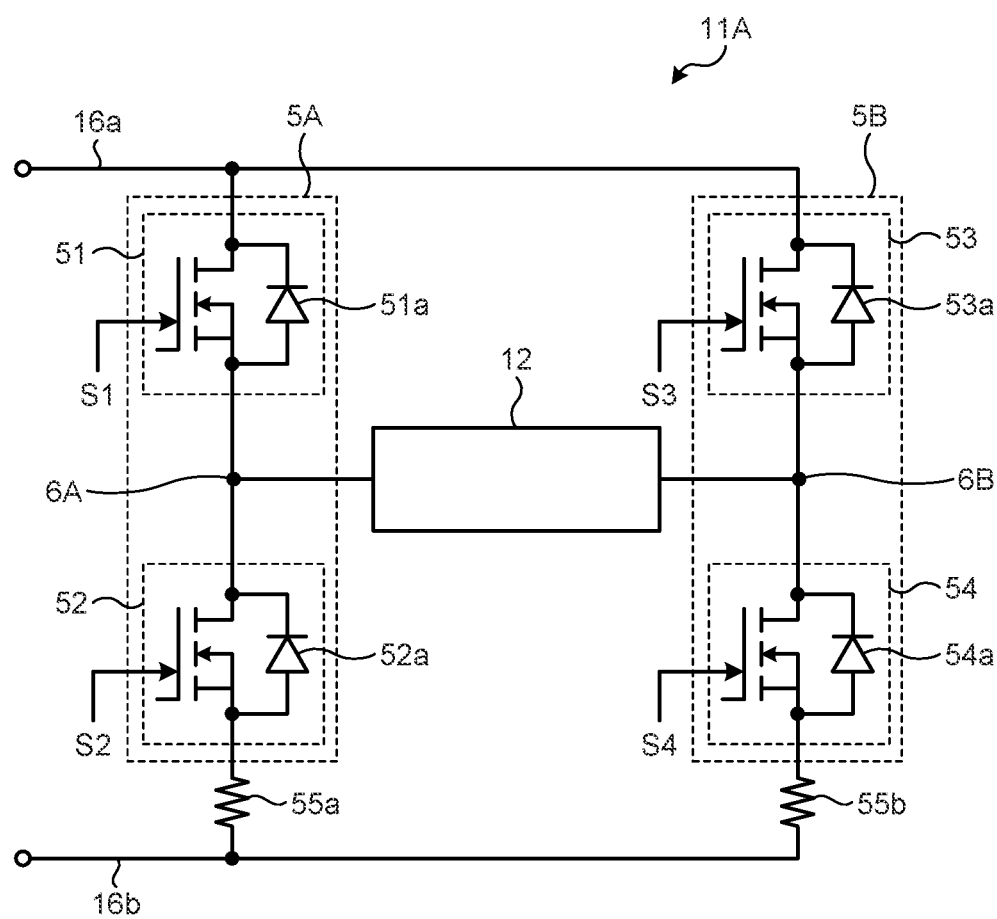
FIG. 6 is a circuit diagram illustrating a modification of the inverter illustrated in FIG. 5.

FIG. 6 is a circuit diagram illustrating a modification of the inverter 11 illustrated in FIG. 5. The inverter 11A illustrated in FIG. 6 includes shunt resistors 55a and 55b in addition to the components of the inverter 11 illustrated in FIG. 5. The shunt resistor 55a is a detector for detecting the current flowing in the leg 5A, and the shunt resistor 55b is a detector for detecting the current flowing in the leg 5B. As illustrated in FIG. 6, the shunt resistor 55a is connected between the terminal on the low potential side of the switching element 52 and the direct-current bus 16b, and the shunt resistor 55b is connected between the terminal on the low potential side of the switching element 54 and the direct-current bus 16b. In the case of using the inverter 11A including the shunt resistors 55a and 55b, the current detector 22 illustrated in FIG. 1 can be removed. In this configuration, detected values from the shunt resistors 55a and 55b are sent to the processor 31 via the analog-to-digital converter 30. The processor 31 performs the startup control and the normal control described later based on the detected values from the shunt resistors 55a and 55b.

Note that the shunt resistor 55a is not limited to that illustrated in FIG. 6 as long as it can detect the current flowing in the leg 5A. The shunt resistor 55a may be disposed between the direct-current bus 16a and the terminal on the high potential side of the switching element 51. Alternatively, the shunt resistor 55a may be disposed between the terminal on the low potential side of the switching element 51 and the connection end 6A. Alternatively, the shunt resistor 55a may be disposed between the connection end 6A and the terminal on the high potential side of the switching element 52. Similarly, the shunt resistor 55b may be disposed between the direct-current bus 16a and the terminal on the high potential side of the switching element 53. Alternatively, the shunt resistor 55b may be disposed between the terminal on the low potential side of the switching element 53 and the connection end 6B. Alternatively, the shunt resistor 55b may be disposed between the connection end 6B and the terminal on the high potential side of the switching element 54. Instead of the shunt resistors 55a and 55b, the on-resistance of the MOFFETs may be used to achieve a configuration in which the current is detected with the voltage generated across the on-resistance.

Figure 7:
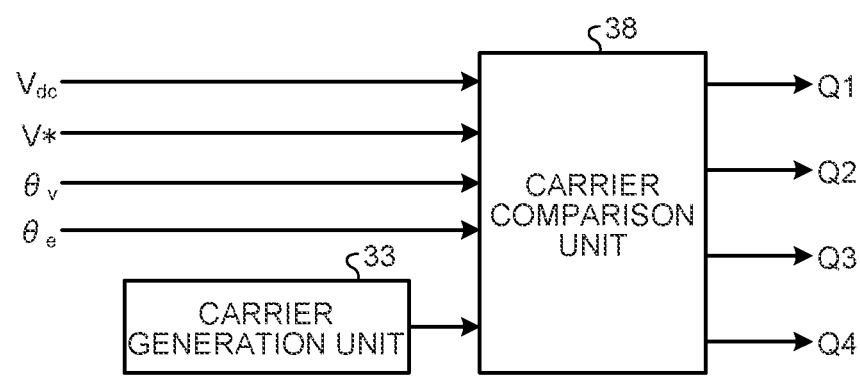
FIG. 7 is a block diagram illustrating a functional part that generates pulse width modulation (PWM) signals among the functional parts of the control unit illustrated in FIG. 1.

FIG. 7 is a block diagram illustrating a functional part that generates PWM signals among the functional parts of the control unit 25 illustrated in FIG. 1.

In FIG. 7, the carrier comparison unit 38 receives input of a lead angle phase $\theta_v$ under lead angle control and a reference phase $\theta_e$, which are used for generating the voltage command $V_m$ as described later. The reference phase $\theta_e$ is a phase obtained by converting a rotor mechanical angle $\theta_m$, i.e. an angle from the reference position of the rotor 12a, into an electric angle. Note that, as described above, the motor driving apparatus 2 according to the present embodiment has what is called a position sensorless drive configuration, in which position sensor signals from a position sensor are not used. Thus, the rotor mechanical angle $\theta_m$ and the reference phase $\theta_e$ are estimated by computation. The "lead angle phase" as used herein represents the "lead angle" of the voltage command in phase. Further, the "lead angle" as used herein is the phase difference between the motor-applied voltage applied to the winding 12f of the stator 12b and the motor-induced voltage induced in the winding 12f of the stator 12b. Note that the "lead angle" takes a positive value when the motor applied voltage has its phase leading a phase of the motor induced voltage.

In addition to the lead angle phase $\theta_v$ and the reference phase $\theta_e$, the carrier comparison unit 38 receives input of the carrier generated by the carrier generation unit 33, the direct-current voltage $V_{dc}$, and the voltage amplitude command V*. The voltage amplitude command V* is the amplitude value of the voltage command $V_m$. The carrier comparison unit 38 generates the PWM signals Q1 to Q4 on the basis of the carrier, the lead angle phase $\theta_v$, the reference phase $\theta_e$, the direct-current voltage $V_{dc}$, and the voltage amplitude command V*.

Figure 8:
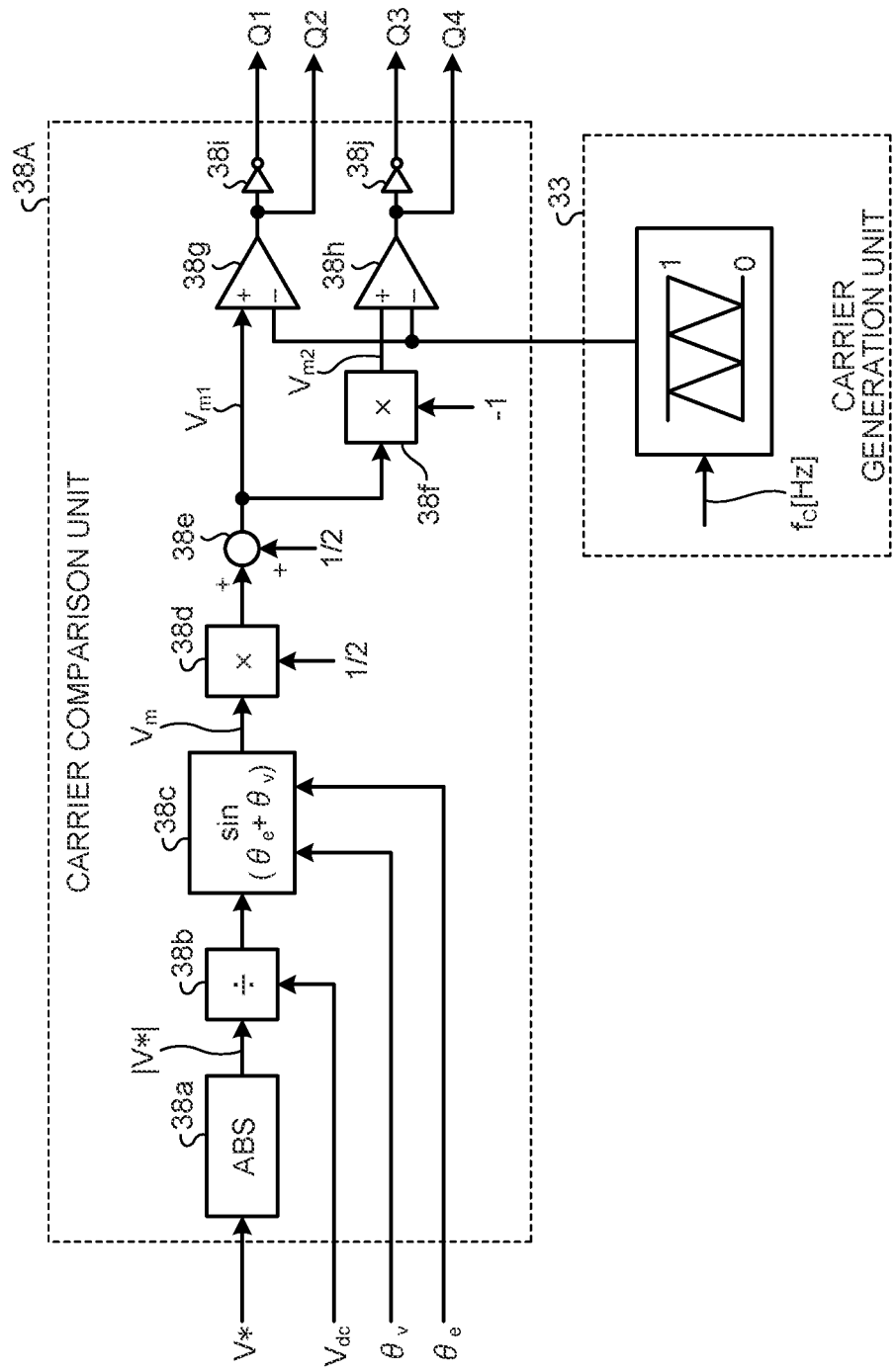
FIG. 8 is a block diagram illustrating an example of the carrier comparison unit illustrated in FIG. 7.

FIG. 8 is a block diagram illustrating an example of the carrier comparison unit 38 illustrated in FIG. 7. FIG. 8 depicts the detailed configuration of the carrier comparison unit 38A and the carrier generation unit 33.

In FIG. 8, a carrier frequency $f_c$ [Hz], which is the frequency of the carrier, is set in the carrier generation unit 33. As indicated by the arrow of the carrier frequency $f_c$, a triangular wave carrier that moves up and down between "0" and "1" is illustrated as an example of the carrier waveform. The PWM control of the inverter 11 includes synchronous PWM control and asynchronous PWM control. In the case of synchronous PWM control, it is necessary to synchronize the carrier with the lead angle phase $\theta_v$. On the other hand, in the case of asynchronous PWM control, it is not necessary to synchronize the carrier with the lead angle phase $\theta_v$.

As illustrated in FIG. 8, the carrier comparison unit 38A includes an absolute value computation unit 38a, a division unit 38b, a multiplication unit 38c, a multiplication unit 38d, a multiplication unit 38f, an addition unit 38e, a comparison unit 38g, a comparison unit 38h, an output inversion unit 38i, and an output inversion unit 38j.

The absolute value computation unit 38a computes an absolute value |V*| of the voltage amplitude command V*. The division unit 38b divides the absolute value |V*| by the direct-current voltage $V_{dc}$ detected by the voltage detector 20. In the configuration of FIG. 8, the output of the division unit 38b is used as the modulation factor. Battery voltage, which is the output voltage of the battery 10, fluctuates due to a continuous flow of current. However, dividing the absolute value |V*| by the direct-current voltage $V_{dc}$ enables the value of the modulation factor to be adjusted so that the motor applied voltage does not decrease due to a decrease in battery voltage.

The multiplication unit 38c computes the sine value of "$\theta_e+\theta_v$", i.e. the reference phase $\theta_e$ plus the lead angle phase $\theta_v$. The computed sine value of "$\theta_e+\theta_v$" is multiplied by the modulation factor that is the output of the division unit 38b. The multiplication unit 38d multiplies the voltage command $V_m$, which is the output of the multiplication unit 38c, by "1/2". The addition unit 38e adds "1/2" to the output of the multiplication unit 38d. The multiplication unit 38f multiplies the output of the addition unit 38e by "−1". Also, the output of the addition unit 38e is input to the comparison unit 38g as a positive voltage command $V_{m1}$ for driving the two switching elements 51 and 53 of the upper arm among the plurality of switching elements 51 to 54. The output of the multiplication unit 38f is input to the comparison unit 38h as a negative voltage command V for driving the two switching elements 52 and 54 of the lower arm.

The comparison unit 38g compares the positive voltage command $V_{m1}$ with the amplitude of the carrier. The output of the output inversion unit 38i, which is the inverted output of the comparison unit 38g, serves as the PWM signal Q1 for the switching element 51, and the output of the comparison unit 38g serves as the PWM signal Q2 for the switching element 52. Similarly, the comparison unit 38h compares the negative voltage command $V_{m2}$ with the amplitude of the carrier. The output of the output inversion unit 38j, which is the inverted output of the comparison unit 38h, serves as the PWM signal Q3 for the switching element 53, and the output of the comparison unit 38h serves as the PWM signal Q4 for the switching element 54. The output inversion unit 38i ensures that the switching element 51 and the switching element 52 are not on at the same time, and the output inversion unit 38j ensures that the switching element 53 and the switching element 54 are not on at the same time.

Figure 9:
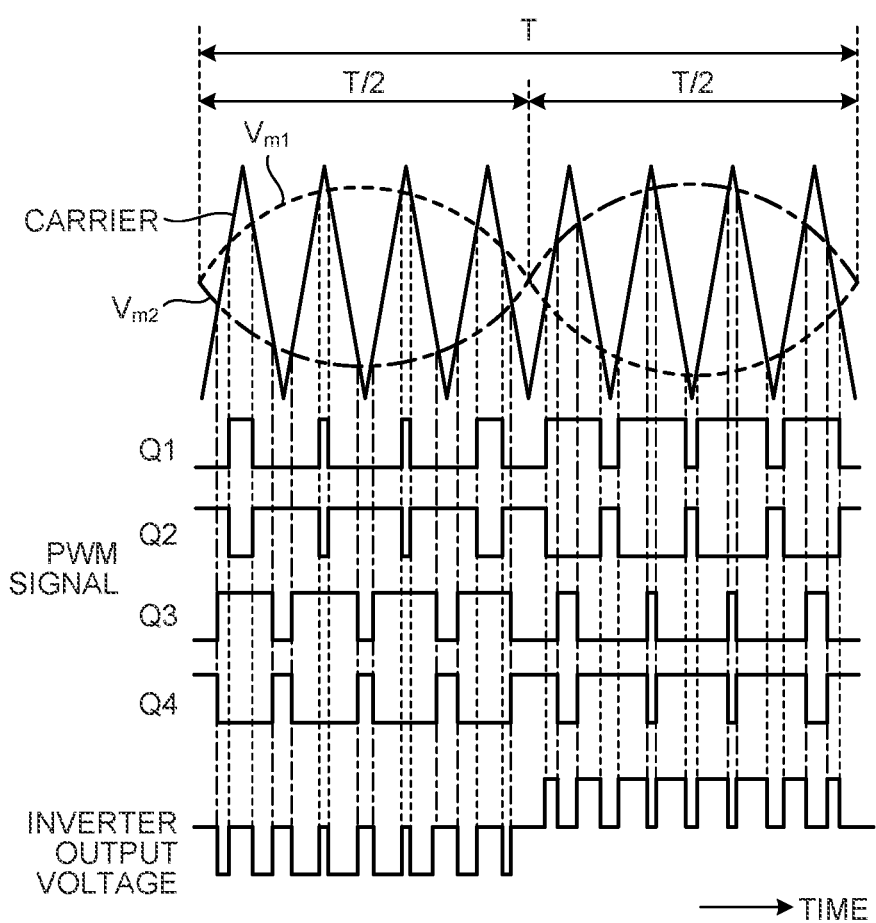
FIG. 9 is a time chart illustrating examples of the main waveforms in the case that the carrier comparison unit illustrated in FIG. 8 is used for operation.

FIG. 9 is a time chart illustrating examples of the main waveforms in the case that the carrier comparison unit 38A illustrated in FIG. 8 is used for operation. FIG. 9 depicts the waveform of the positive voltage command $V_{m1}$ output from the addition unit 38e, the waveform of the negative voltage command $V_{m2}$ output from the multiplication unit 38f, the waveforms of the PWM signals Q1 to Q4, and the waveform of the inverter output voltage.

The PWM signal Q1 is "Low" when the positive voltage command $V_{m1}$ is larger than the carrier, and "High" when the positive voltage command $V_{m1}$ is smaller than the carrier. The PWM signal Q2 is the inverted signal of the PWM signal 01. The PWM signal 03 is "Low" when the negative voltage command $V_{m2}$ is larger than the carrier, and "High" when the negative voltage command V is smaller than the carrier. The PWM signal Q4 is the inverted signal of the PWM signal Q3. In this way, the circuit illustrated in FIG. 8 is configured as "Low Active", but may be configured as "High Active", in which each signal has the opposite value.

As illustrated in FIG. 9, the waveform of the inverter output voltage contains voltage pulses due to the difference voltage between the PWM signal Q1 and the PWM signal Q4 and voltage pulses due to the difference voltage between the PWM signal Q3 and the PWM signal Q2. These voltage pulses are applied to the single-phase motor 12 as the motor applied voltage.

Known modulation methods used in generating the PWM signals Q1 to Q4 include bipolar modulation and unipolar modulation. Bipolar modulation is a modulation method for outputting voltage pulses that switch to a positive or negative potential for each period of the voltage command $V_m$. Unipolar modulation is a modulation method for outputting voltage pulses that switch between three potentials for each period of the voltage command $V_m$, that is, voltage pulses that switch between a positive potential, a negative potential, and zero potential. The waveforms illustrated in FIG. 9 are produced by unipolar modulation. The motor driving apparatus 2 according to the present embodiment may use either modulation method. In applications that requires control for providing the motor current waveform closer to a sinusoidal wave, it is preferable to employ unipolar modulation, which has a lower harmonic content than bipolar modulation.

The waveforms illustrated in FIG. 9 are obtained with a method in which the four switching elements of the switching elements 51 and 52 constituting the leg 5A and the switching elements 53 and 54 constituting the leg 5B are subjected to switching operation during the time period of a half period T/2 of the voltage command $V_m$. This method is called "two-sided PWM" because switching operation is performed with both the positive voltage command $V_{m1}$ and the negative voltage command $V_{m2}$. There is another method called "one-sided PWM" in contrast to the "two-sided PWM". For the "one-sided PWM", the switching operation of the switching elements 51 and 52 is suspended in one half of one period T of the voltage command $V_m$, and the switching operation of the switching elements 53 and 54 is suspended in the other half of the one period T of the voltage command $V_m$. The "one-sided PWM" will be described hereinafter. In the following description, the operation mode in which two-sided PWM is used for operation is referred to as "two-sided PWM mode", and the operation mode in which one-sided PWM is used for operation is referred to as "one-sided PWM mode". The PWM signals based on "two-sided PWM" may be referred to as "two-sided PWM signals", and the PWM signals based on "one-sided PWM" may be referred to as "one-sided PWM signals".

Figure 10:
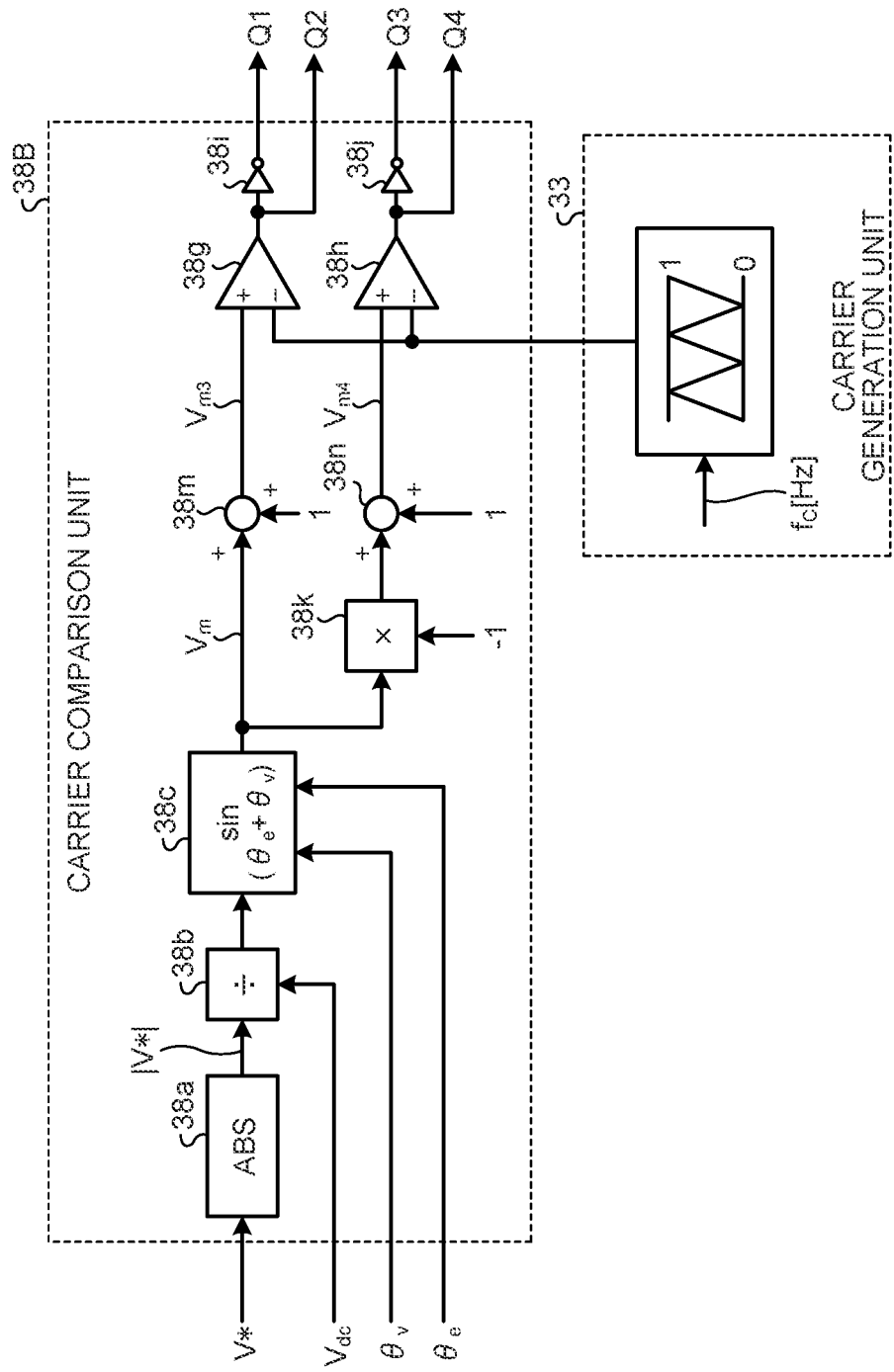
FIG. 10 is a block diagram illustrating another example of the carrier comparison unit illustrated in FIG. 7.

FIG. 10 is a block diagram illustrating another example of the carrier comparison unit 38 illustrated in FIG. 7. FIG. 10 depicts an example of a circuit generating the above-mentioned one-sided PWM signals. Specifically, FIG. 10 depicts the detailed configuration of a carrier comparison unit 38B and the carrier generation unit 33. Note that the configuration of the carrier generation unit 33 illustrated in FIG. 10 is the same as or equivalent to that illustrated in FIG. 8. Components in the configuration of the carrier comparison unit 38B illustrated in FIG. 10 that are the same as or equivalent to those of the carrier comparison unit 38A illustrated in FIG. 8 are denoted by the same reference signs.

As illustrated in FIG. 10, the carrier comparison unit 38B includes the absolute value computation unit 38a, the division unit 38b, the multiplication unit 38c, a multiplication unit 38k, an addition unit 38m, an addition unit 38n, the comparison unit 38g, the comparison unit 38h, the output inversion unit 38i, and the output inversion unit 38j.

The absolute value computation unit 38a computes the absolute value |V*| of the voltage amplitude command V*. The division unit 38b divides the absolute value |V*| by the direct-current voltage $V_{dc}$ detected by the voltage detector 20. The output of the division unit 38b is used as the modulation factor also in the configuration of FIG. 10.

The multiplication unit 38c computes the sine value of "$\theta_e + \theta_v$", i.e. the reference phase $\theta_e$ plus the lead angle phase $\theta_v$. The computed sine value of "$\theta_e + \theta_v$" is multiplied by the modulation factor that is the output of the division unit 38b. The multiplication unit 38k multiplies the voltage command $V_m$, which is the output of the multiplication unit 38c, by "−1". The addition unit 38m adds "1" to the voltage command $V_m$ that is the output of the multiplication unit 38c. The addition unit 38n adds "1" to the output of the multiplication unit 38k, that is, the inverted output of the voltage command $V_m$. The output of the addition unit 38m is input to the comparison unit 38g as a first voltage command $V_{m3}$ for driving the two switching elements 51 and 53 of the upper arm among the plurality of switching elements 51 to 54. The output of the addition unit 38n is input to the comparison unit 38h as a second voltage command $V_{m4}$ for driving the two switching elements 52 and 54 of the lower arm.

The comparison unit 38g compares the first voltage command $V_{m3}$ with the amplitude of the carrier. The output of the output inversion unit 38i, which is the inverted output of the comparison unit 38g, serves as the PWM signal Q1 for the switching element 51, and the output of the comparison unit 38g serves as the PWM signal Q2 for the switching element 52. Similarly, the comparison unit 38h compares the second voltage command $V_{m4}$ with the amplitude of the carrier. The output of the output inversion unit 38j, which is the inverted output of the comparison unit 38h, serves as the PWM signal Q3 for the switching element 53, and the output of the comparison unit 38h serves as the PWM signal Q4 for the switching element 54. The output inversion unit 38i ensures that the switching element 51 and the switching element 52 are not on at the same time, and the output inversion unit 38j ensures that the switching element 53 and the switching element 54 are not on at the same time.

Figure 11:
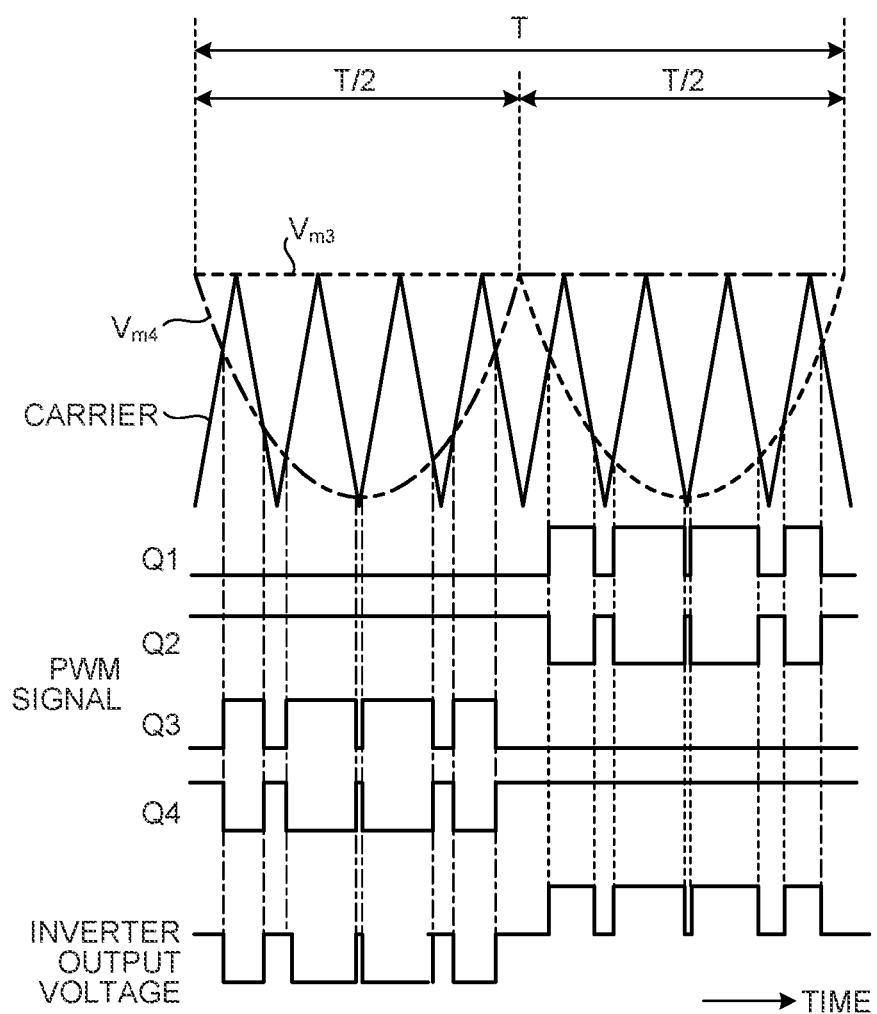
FIG. 11 is a time chart illustrating examples of the main waveforms in the case that the carrier comparison unit illustrated in FIG. 10 is used for operation.

FIG. 11 is a time chart illustrating examples of the main waveforms in the case that the carrier comparison unit 38B illustrated in FIG. 10 is used for operation. FIG. 11 depicts the waveform of the first voltage command $V_{m3}$ output from the addition unit 38m, the waveform of the second voltage command $V_{m4}$ output from the addition unit 38n, the waveforms of the PWM signals Q1 to Q4, and the waveform of the inverter output voltage. In FIG. 11, for convenience, the waveform portion of the first voltage command $V_{m3}$ having amplitude values larger than the peak value of the carrier and the waveform portion of the second voltage command $V_{m4}$ having amplitude values larger than the peak value of the carrier are represented by flat straight lines.

The PWM signal Q1 is "Low" when the first voltage command $V_{m3}$ is larger than the carrier, and "High" when the first voltage command $V_{m3}$ is smaller than the carrier. The PWM signal Q2 is the inverted signal of the PWM signal Q1. The PWM signal Q3 is "Low" when the second voltage command $V_{m4}$ is larger than the carrier, and "High" when the second voltage command $V_{m4}$ is smaller than the carrier. The PWM signal Q4 is the inverted signal of the PWM signal Q3. In this way, the circuit illustrated in FIG. 10 is configured as "Low Active", but may be configured as "High Active", in which each signal has the opposite value.

As illustrated in FIG. 11, the waveform of the inverter output voltage contains voltage pulses due to the difference voltage between the PWM signal Q1 and the PWM signal Q4 and voltage pulses due to the difference voltage between the PWM signal Q3 and the PWM signal Q2. These voltage pulses are applied to the single-phase motor 12 as the motor applied voltage.

The waveforms illustrated in FIG. 11 show that the switching operation of the switching elements 51 and 52 is suspended in one half of the one period T of the voltage command $V_m$, and the switching operation of the switching elements 53 and 54 is suspended in the other half of the one period T of the voltage command $V_m$.

The waveforms illustrated in FIG. 11 also show that the switching element 52 is controlled such that the switching element 52 is always in an on state in one half of the one period T of the voltage command $V_m$, and the switching element 54 is controlled such that the switching element 54 is always in an on state in the other half of the one period T of the voltage command $V_m$. Note that FIG. 11 is an example, and it is also possible that the switching element 51 is controlled such that the switching element 51 is always in an on state in one half of the period, and the switching element 53 is controlled such that the switching element 53 is always in an on state in the other half of the period. That is, the waveforms illustrated in FIG. 11 are characterized in that at least one of the switching elements 51 to 54 is controlled such that the at least one switching element is in an on state in half a period of the voltage command $V_m$.

In FIG. 11, the waveform of the inverter output voltage is a result of unipolar modulation, in which the waveform switches between three potentials for each period of the voltage command $V_m$. As described above, bipolar modulation may be used instead of unipolar modulation, but it is preferable to employ unipolar modulation in applications that require control for providing the motor current waveform closer to a sinusoidal wave.

Figure 12:
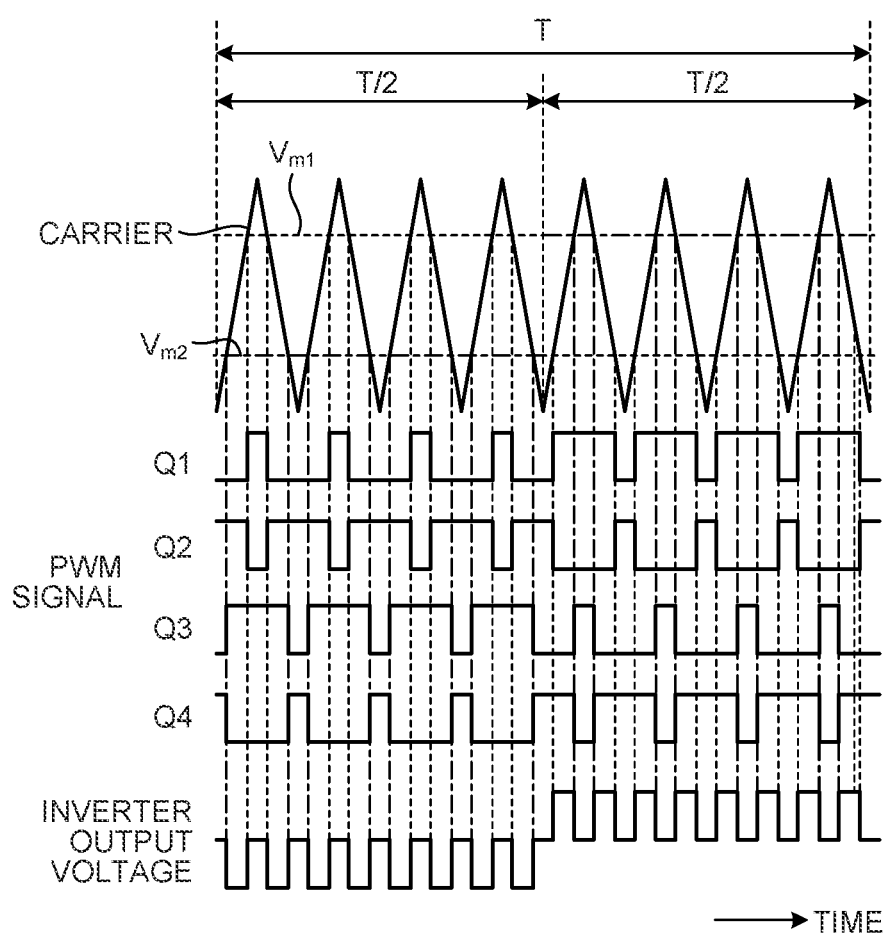
FIG. 12 is a time chart, different from that in FIG. 9, illustrating examples of the main waveforms in the case that the carrier comparison unit illustrated in FIG. 8 is used for operation.

FIG. 12 is a time chart, different from that in FIG. 9, illustrating examples of the main waveforms in the case that the carrier comparison unit 38A illustrated in FIG. 8 is used for operation. In contrast to FIG. 9, in which the positive voltage command $V_{m1}$ and the negative voltage command $V_{m2}$ have sinusoidal waves, FIG. 12 depicts the case where the positive voltage command $V_{m1}$ and the negative voltage command $V_{m2}$ have fixed values, that is, the case where the voltage command $V_m$ is a direct current. Hereinafter, to drive the single-phase motor 12 based on the direct-current voltage command $V_m$ is referred to as "direct-current excitation". In direct-current excitation, in a case where the direct-current voltage command $V_m$ has a constant value for each time period of a half period T/2 of the voltage command $V_m$, every pulse has an equal pulse width, that is, a fixed-width voltage pulse train is obtained in each of the PWM signals Q1 to Q4. In addition, it is also possible to generate the PWM signals Q1 to Q4 for direct-current excitation by using the carrier comparison unit 38B illustrated in FIG. 10. Specifically, in the case of the carrier comparison unit 38B illustrated in FIG. 10, for example, the value of "$\theta_e+\theta_v$" that is input to the multiplication unit 38c is set to $\pi/2$, and the value of the coefficient "1" that is added in the addition unit 38m and the value of the coefficient "1" that is added in the addition unit 38n are adjusted as appropriate, whereby the waveforms of the PWM signals Q1 to Q4 for direct-current excitation can be obtained.

Figure 13:
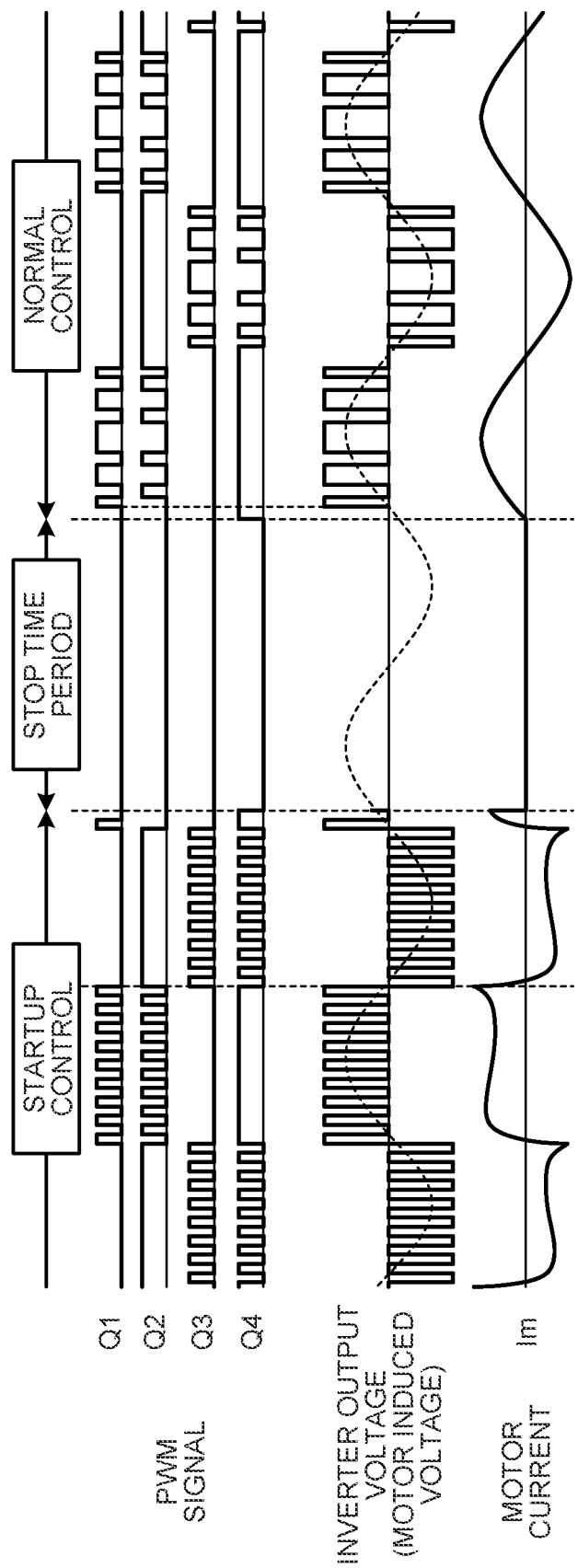
FIG. 13 is a first time chart used for explaining operation according to the embodiment.
Figure 14:
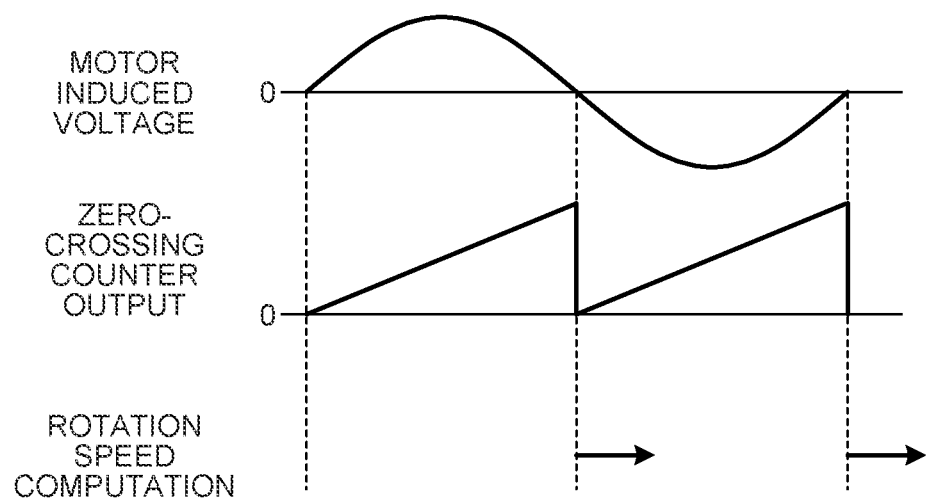
FIG. 14 is a second time chart used for explaining operation according to the embodiment.

Next, the main operation according to the present embodiment will be described. FIG. 13 is a first time chart used for explaining operation according to the embodiment. FIG. 14 is a second time chart used for explaining operation according to the embodiment. Although the single-phase motor 12 including the asymmetric teeth 12e is illustrated as an example in FIGS. 2 and 3 described above, the single-phase motor to be driven is not limited to that which has the structure illustrated in FIGS. 2 and 3. That is, the method according to the present embodiment is applicable not only to the case where the teeth 12e have an asymmetrical shape but also to the case where the teeth 12e have a symmetrical shape.

In FIG. 13, the upper part depicts the waveforms of the PWM signals Q1 to Q4, and the lower part depicts the waveform of the motor current $I_m$. In the middle part, the waveform of the inverter output voltage is indicated by the solid line, and the waveform of the motor induced voltage is indicated by the broken line. Note that each waveform illustrated in FIG. 13 is obtained in the case that the carrier comparison unit 38B illustrated in FIG. 10 is used for operation. As described above, one-sided PWM signals are generated in the carrier comparison unit 38B. In the following description, control at startup is referred to as "startup control", and control during normal operation, that is, control at any time other than startup is referred to as "normal control".

In the startup control, PWM signals are generated by direct-current excitation. The PWM signals generated by direct-current excitation are voltage pulse trains having a pulsed shape as illustrated in the upper part of FIG. 13. Due to these voltage pulse trains, the inverter output voltage illustrated in the middle part of FIG. 13 is applied to the single-phase motor 12. At this time, the motor current $I_m$ illustrated in the lower part flows through the single-phase motor 12. Note that the inverter output voltage applied to the single-phase motor 12 in the startup control may be referred to as the "first voltage".

Once the single-phase motor 12 reaches a specified rotation speed, the inverter 11 goes into a gate-off state. As a result, the application of the first voltage to the single-phase motor 12 is stopped. The stoppage of application of the first voltage is continued during a stop time period. The stop time period is a time period during which the application of the first voltage is stopped. Note that the time period in which the startup control is performed, that is, the time from the start of the startup control to the stop of the application of the first voltage, may be the time until the single-phase motor 12 reaches the specified rotation speed or a specified time set in advance.

During the stop time period, the motor induced voltage is detected by the voltage detector 21. The control unit 25 performs interpolar detection of the rotor magnetic poles based on the zero-crossings of the motor induced voltage, and computes the rotation speed of the single-phase motor 12 based on the zero-crossing period of the motor induced voltage. FIG. 14 schematically depicts a process of computing the rotation speed using a zero-crossing counter. As illustrated in FIG. 14, the rotation speed is computed in synchronization with the timing when the zero-crossing counter is reset to zero. In this manner, with the method according to the present embodiment, the motor induced voltage during the stop time period is monitored, and the rotation speed is computed based on the motor induced voltage during the stop time period. This makes it possible to accurately compute the rotation speed even while the rotation speed is fluctuating.

In the above-described example, the motor induced voltage is detected by the voltage detector 21, but the present invention is not limited to this example. The voltage detector 21 is a detector that detects the alternating-current voltage $V_{ac}$ generated between the connection lines 18a and 18b, but instead of the alternating-current voltage $V_{ac}$ between the connection lines 18a and 18b, the voltage detector 21 may detect the voltage between the input terminals (not illustrated) in the single-phase motor 12 connected to the inverter 11. The connection lines 18a and 18b are electrical wiring on the alternating-current side of the inverter 11, but the voltage on the direct-current side of the inverter 11 may be detected. As an example, it is possible to employ a configuration for detection in which a resistor for voltage detection is connected between the direct-current buses 16a and 16b on the direct-current side of the inverter 11. However, detection on the direct-current side of the inverter 11 requires control means for setting the output voltage of the battery 10 to zero or a mechanism for cutting the electrical connection between the battery 10 and the inverter 11.

Once the stop time period ends, the process transitions to the normal control illustrated in FIG. 13. In the normal control, PWM signals based on a sinusoidal voltage command are generated as illustrated in the upper part, and the inverter output voltage illustrated in the middle part is applied to the single-phase motor 12. At this time, the sinusoidal motor current $I_m$ as illustrated in the lower part flows through the single-phase motor 12. Note that the inverter output voltage applied to the single-phase motor 12 in the normal control may be referred to as the "second voltage".

The application of the second voltage is performed based on the motor induced voltage. In the example of FIG. 13, the PWM signals Q1 and Q4 are turned on at the timing when the motor induced voltage crosses zero. By controlling the timing of applying the second voltage based on the motor induced voltage in this way, it is possible to prevent the motor current $I_m$ from becoming an overcurrent.

In the normal control example illustrated in FIG. 13, a sinusoidal voltage command is used to control the single-phase motor 12 with high efficiency, but the present invention is not limited to this example. In a case where the motor driving apparatus 2 is applied to a product in which acceleration performance is more important than efficiency, for example, a square-wave voltage command may be used.

Figure 15:
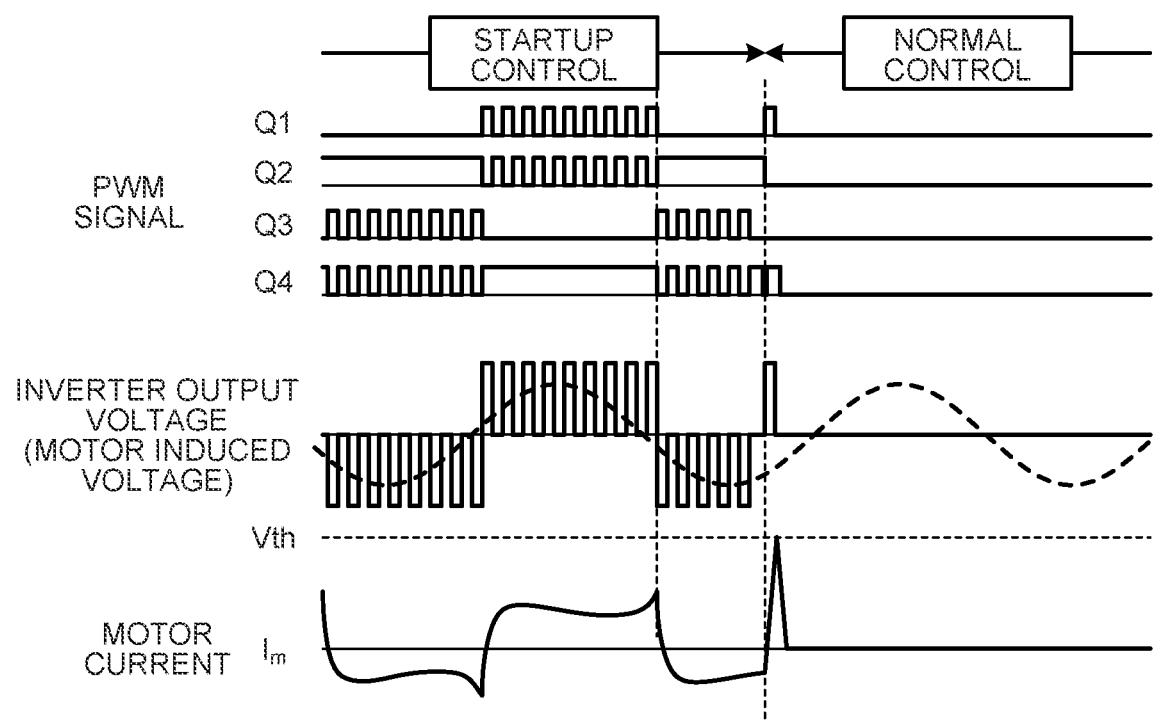
FIG. 15 is a time chart used for explaining operation according to a comparative example in comparison with FIG. 13.

Next, the significance of providing the stop time period as illustrated in FIG. 13 in the startup control according to the embodiment will be described. FIG. 15 is a time chart used for explaining operation according to a comparative example in comparison with FIG. 13. In FIG. 15, the upper part depicts the waveforms of the PWM signals Q1 to Q4, and the lower part depicts the waveform of the motor current $I_m$. In the middle part, the waveform of the inverter output voltage is indicated by the solid line, and the waveform of the motor induced voltage is indicated by the broken line.

When switching from the startup control to the normal control, the motor current $I_m$ depends on the difference voltage between the inverter output voltage and the motor induced voltage. Therefore, if the control is switched when the difference voltage is large, an excessive current may flow. FIG. 15 shows how the motor current $I_m$ exceeds a threshold Vth which is an overcurrent cutoff value. In the event that the motor current $I_m$ exceeds the overcurrent cutoff value, it is necessary to put the inverter 11 into a gate-off state, and the drive of the single-phase motor 12 must be interrupted.

In order to deal with the above problem, in the present embodiment, the stop time period is provided between the startup control and the normal control as described above. In addition, during the stop time period, the inverter 11 is put into a gate-off state and motor induced voltage information is acquired as described above. Then, the timing of applying the second voltage is determined based on the motor induced voltage information. Then, after a lapse of the stop time period, the inverter 11 is put into a gate-on state and the second voltage is applied to drive the single-phase motor 12. This prevents an excessive current from flowing in the single-phase motor 12.

In the above-described example, the timing of applying the second voltage is determined based on the motor induced voltage, but the present invention is not limited to this example. The timing of applying the second voltage may be determined based on the motor current $I_m$. The motor current $I_m$ is detected by the current detector 22. Therefore, the timing of applying the second voltage can be determined based on the detected value from the current detector 22. Specifically, the timing at which the detected value of the motor current $I_m$ crosses zero can be designated as the timing of applying the second voltage.

Next, a specific example of setting the stop time period will be described.

(1) Lower Limit of Stop Time Period

The lower limit of the stop time period can be determined based on the following setting guidelines A and B.

<Setting Guideline A>

A time of 3τ or more, in which the motor current $I_m$ becomes 5% or less. The reference character "τ" is a time constant.

The time constant τ can be found from motor constants of the single-phase motor 12. Assuming that the motor constants are resistance value R and inductance value L, the time constant τ is represented by τ=L/R. For example, in the case of R=0.5 [Ω] and L=300 [μH], τ=L/R=0.6 [ms] is obtained, and 3τ=1.8 [ms] is derived.

<Setting Guideline B>

One period or more of the electrical angular frequency estimated at startup.

For example, in a case where the rotation speed at startup is 37500 [rpm] and the number of pole pairs is 2, calculations are performed as follows.

Mechanical angular frequency: 37500 [rpm]→625 [rps]

Electrical angular frequency: 1250 [Hz]=625 [rps]×2 (number of pole pairs)

One period of electric angle: 1/1250 [Hz]=800 [μs]

In this manner, because the setting guideline A provides 1.8 [ms] and the setting guideline B provides 800 [μs], the shorter one 800 [μs] is employed. Therefore, in this example, the lower limit of the stop time period is set to 800 [μs].

(2) Upper Limit of Stop Time Period

If the stop time period is long, a large difference occurs between the rotation speed estimated at startup and the rotation speed at the time of application of the second voltage after a lapse of the stop time period. If the second voltage is applied in such a state, the motor current $I_m$ may exceed the overcurrent cutoff value, or the impact on the single-phase motor 12 may increase. Therefore, as the upper limit, it is necessary to set a time during which the rotation speed is not attenuated. Here, the degree to which the rotation speed is attenuated largely depends on the inertia of the load connected to the single-phase motor 12. Thus, the upper limit of the stop time period can be determined based on the inertia of the load connected to the single-phase motor 12.

As described above, the motor driving apparatus according to the embodiment applies the first voltage to the single-phase motor at startup and applies the second voltage to the single-phase motor during the normal control after the startup. The stop time period is present after the application of the first voltage, in which the application of the first voltage is stopped, and the motor driving apparatus applies the second voltage after a lapse of the stop time period. This makes it possible to activate the single-phase motor safely and reliably in the case of position sensorless startup of the single-phase motor.

Note that the lower limit of the stop time period can be determined based on motor constants of the single-phase motor or the rotation speed of the single-phase motor at startup. The upper limit of the stop time period can be determined based on the inertia of the load connected to the single-phase motor.

In addition, the characteristics of the load connected to the single-phase motor can be fully obtained at the product testing stage. Therefore, the range of the stop time period can be strictly set according to the load conditions. This makes it possible to determine the timing of applying the second voltage without even detecting the motor induced voltage or the motor current.

Next, examples of application of the motor driving apparatus according to the embodiment will be described. The motor driving apparatus described above can be used, for example, in a vacuum cleaner. In the case of a product such as a vacuum cleaner that is used immediately after the power is turned on, the effect of shortening the startup time achieved by the motor driving apparatus according to the embodiment is increased.

Figure 16:
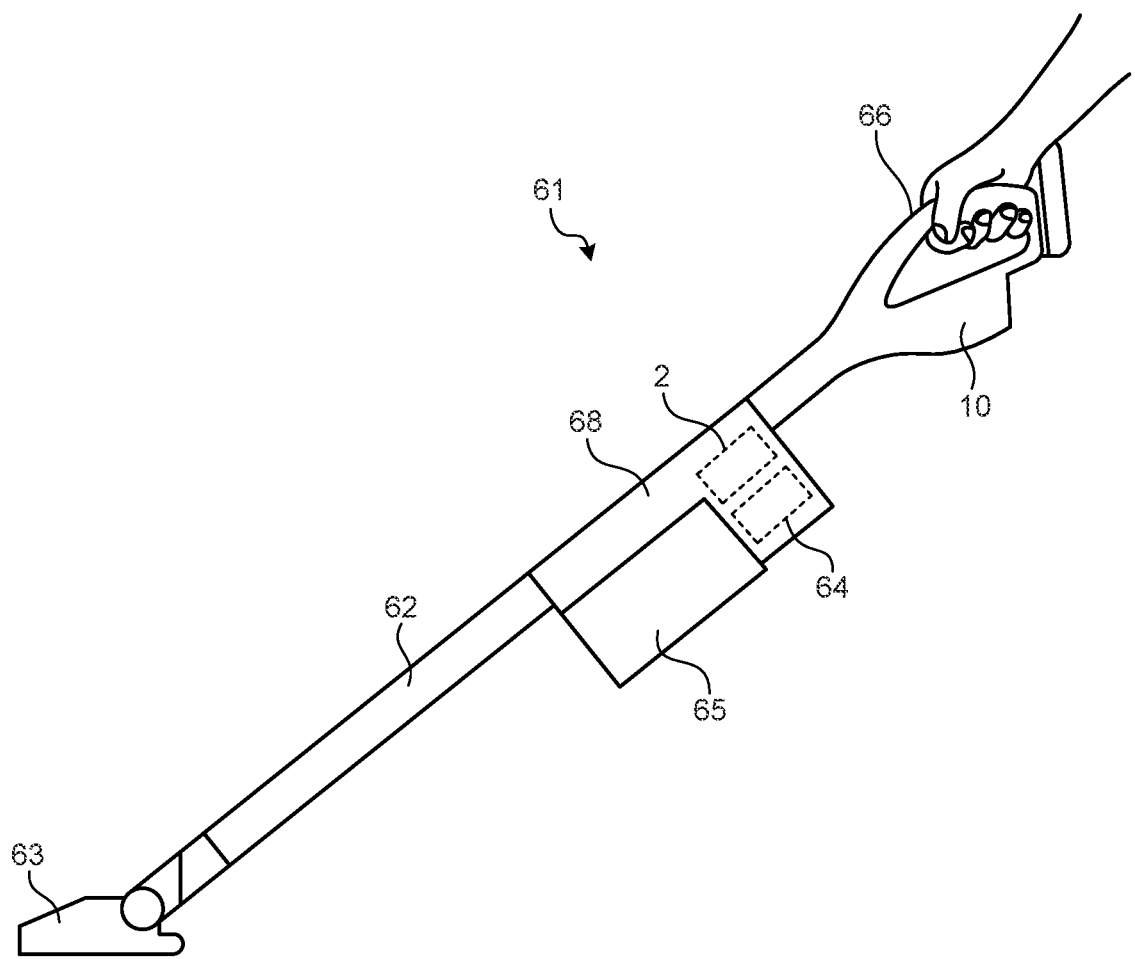
FIG. 16 is a diagram illustrating the configuration of a vacuum cleaner including a motor driving apparatus according to the embodiment.

FIG. 16 is a diagram illustrating the configuration of a vacuum cleaner 61 including the motor driving apparatus 2 according to the embodiment. The vacuum cleaner 61 illustrated in FIG. 16 is what is called a stick-type vacuum cleaner. In FIG. 16, the vacuum cleaner 61 includes the battery 10 illustrated in FIG. 1, the motor driving apparatus 2 illustrated in FIG. 1, an electric blower 64 that is driven by the single-phase motor 12 illustrated in FIG. 1, a dust collection chamber 65, a sensor 68, a suction port 63, an extension pipe 62, and an operation unit 66.

A user who uses the vacuum cleaner 61 holds the operation unit 66 to operate the vacuum cleaner 61. The motor driving apparatus 2 of the vacuum cleaner 61 drives the electric blower 64 using the battery 10 as a power supply. As the electric blower 64 is driven, dust is sucked through the suction port 63. The sucked dust is collected in the dust collection chamber 65 via the extension pipe 62.

Although FIG. 16 depicts a stick-type vacuum cleaner as an example, the present invention is not limited to a stick-type vacuum cleaner. The present invention can be applied to any product that is an electrical device equipped with an electric blower.

Although FIG. 16 depicts a configuration in which the battery 10 is used as a power supply, the present invention is not limited to this. Instead of the battery 10, an alternating-current power supply supplied from an outlet may be used.

Next, another example of application of the motor driving apparatus according to the embodiment will be described. The motor driving apparatus described above can be used, for example, in a hand dryer. In the case of a hand dryer, the shorter the time from inserting a hand to driving the electric blower, the better the user's usability. Therefore, the effect of shortening the startup time achieved by the motor driving apparatus according to the embodiment is greatly exhibited.

Figure 17:
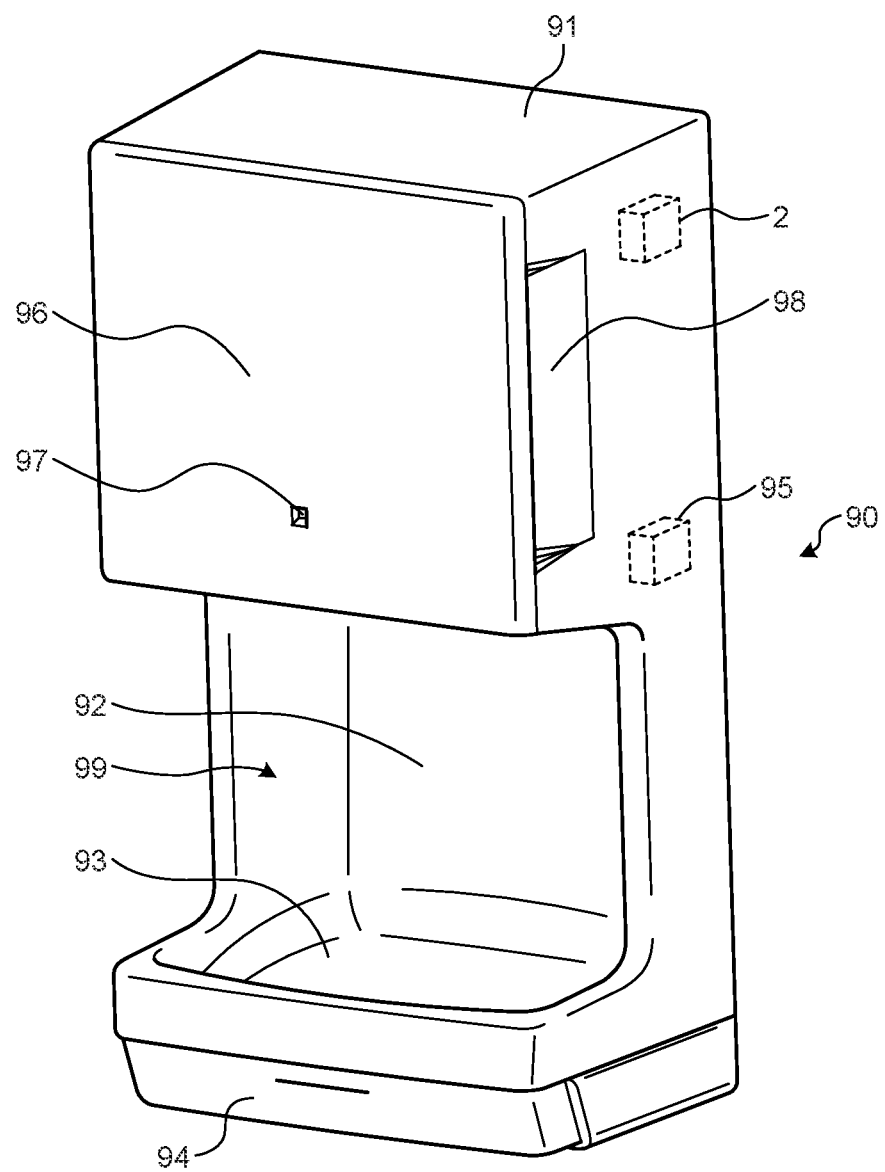
FIG. 17 is a diagram illustrating the configuration of a hand dryer including a motor driving apparatus according to the embodiment.

FIG. 17 is a diagram illustrating the configuration of a hand dryer 90 including the motor driving apparatus 2 according to the embodiment. In FIG. 17, the hand dryer 90 includes the motor driving apparatus 2 illustrated in FIG. 1, a casing 91, a hand detection sensor 92, a water tray 93, a drain container 94, a cover 96, a sensor 97, an intake port 98, and an electric blower 95 that is driven by the single-phase motor 12 illustrated in FIG. 1. Here, the sensor 97 is either a gyro sensor or a motion sensor. In the hand dryer 90, a hand is inserted into a hand insertion portion 99 above the water tray 93, and the water is blown off by air from the electric blower 95. The blown water is collected in the water tray 93, and thereafter stored in the drain container 94.

Because the vacuum cleaner 61 and the hand dryer 90 described above are both position sensorless products including the motor driving apparatus 2 according to the embodiment, the following effects can be obtained.

First, in the case of the position sensorless configuration, because startup can be performed without a position sensor, it is possible to reduce costs such as the material cost and the processing cost of the position sensor. In addition, because there is no position sensor, it is possible to eliminate the influence of position sensor misalignment on performance. Thus, stable performance can be ensured.

In addition, because a position sensor is a sensitive sensor, high mounting accuracy is required regarding the installation position of the position sensor. In addition, after mounting, it is necessary to make adjustments according to the mounting position of the position sensor. On the other hand, in the case of the position sensorless configuration, the position sensor itself is unnecessary, and it is possible to eliminate the step for position sensor adjustment. As a result, the manufacturing cost can be significantly reduced. Moreover, because there is no influence of position sensor aging, the quality of the product can be improved.

In addition, in the case of the position sensorless configuration, because no position sensor is required, the inverter and the single-phase motor can be configured separately. This makes it possible to relax restrictions on the product. For example, in the case of a product that is used in a water place with a large amount of water, the installation position of the inverter in the product can be some point far from the water place. As a result, the probability of failure of the inverter can be reduced, and accordingly the reliability of the device can be improved.

Moreover, in the case of the position sensorless configuration, it is possible to detect motor anomalies such as shaft lock and open phase by detecting the motor current or the inverter current with the current detector disposed instead of a position sensor. Therefore, the product can be safely stopped without a position sensor.

As described above, the present embodiment has provided the exemplary configurations in which the motor driving apparatus is applied to a vacuum cleaner and a hand dryer, but the present invention is not limited to these examples. The motor driving apparatus 2 can be applied to a wide variety of electrical devices equipped with a motor. Examples of electrical devices equipped with a motor include incinerators, crushers, drying machines, dust collectors, printing machines, cleaning machines, confectionery machines, tea making machines, woodworking machines, plastic extruders, cardboard machines, packaging machines, hot air generators, OA equipment, and electric blowers. An electric blower is a blower means for object transportation, dust attraction, or general-purpose blowing and exhausting.

Note that the configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 1 motor driving system; 2 motor driving apparatus; 5A, 5B leg; 6A, 6B connection end; 10 battery; 11, 11A inverter; 12 single-phase motor; 12a rotor; 12b stator; 12c shaft; 12d divided core; 12e teeth; 12e1 first end portion; 12e2 second end portion; 12f winding; 16a, 16b direct-current bus; 18a, 18b connection line; 20, 21 voltage detector; 22 current detector; 25 control unit; 30 analog-to-digital converter; 30a digital output value; 31 processor; 32 drive signal generation unit; 33 carrier generation unit; 34 memory; 38, 38A, 38B carrier comparison unit; 38a absolute value computation unit; 38b division unit; 38c, 38d, 38f, 38k multiplication unit; 38e, 38m, 38n addition unit; 38g, 38h comparison unit; 38i, 38j output inversion unit; 51, 52, 53, 54 switching element; 51a, 52a, 53a, 54a body diode; 55a, 55b shunt resistor; 61 vacuum cleaner; 62 extension pipe; 63 suction port; 64, 95 electric blower; 65 dust collection chamber; 66 operation unit; 68, 97 sensor; 90 hand dryer; 91 casing; 92 hand detection sensor; 93 water tray; 94 drain container; 96 cover; 98 intake port; 99 hand insertion portion.

The invention claimed is:

1. A motor driving apparatus for driving a single-phase motor, the motor driving apparatus comprising:
an inverter disposed between a direct-current power supply and the single-phase motor, the inverter applying a first voltage to the single-phase motor at startup and applying a second voltage to the single-phase motor during a normal operation; and
a voltage detector detecting a voltage on a direct-current side of the inverter, or a voltage detector detecting a voltage on an alternating-current side of the inverter, wherein
a stop time period is present after application of the first voltage, application of the first voltage being stopped during the stop time period,
the inverter applies the second voltage after a lapse of the stop time period, and
a timing of transitioning to the normal operation after the lapse of the stop time period is determined based on a detected value from the voltage detector.

2. The motor driving apparatus according to claim 1, wherein
a lower limit of the stop time period is determined based on a motor constant of the single-phase motor or a rotation speed of the single-phase motor at startup.

3. The motor driving apparatus according to claim 1, wherein
an upper limit of the stop time period is determined based on inertia of a load connected to the single-phase motor.

4. The motor driving apparatus according to claim 1, wherein
the first voltage is a voltage pulse train having a pulsed shape.

5. The motor driving apparatus according to claim 4, wherein
the voltage pulse train is a fixed-width voltage pulse train.

6. The motor driving apparatus according to claim 4, wherein
the voltage pulse train having a pulsed shape is generated based on a carrier and a voltage command.

7. The motor driving apparatus according to claim 1, wherein
the inverter includes a plurality of switching elements that are bridge-connected, and
at least one of the plurality of switching elements is formed of a wide bandgap semiconductor.

8. The motor driving apparatus according to claim 7, wherein
the wide bandgap semiconductor is silicon carbide, gallium nitride, gallium oxide, or diamond.

9. An electric blower comprising the motor driving apparatus according to claim 1.

10. A vacuum cleaner comprising the electric blower according to claim 9.

11. A hand dryer comprising the electric blower according to claim 9.

12. A motor driving apparatus for driving a single-phase motor, the motor driving apparatus comprising:
an inverter disposed between a direct-current power supply and the single-phase motor, the inverter applying a first voltage to the single-phase motor at startup and applying a second voltage to the single-phase motor during a normal operation; and
a current detector detecting a current flowing in the inverter or the single-phase motor, wherein
a stop time period is present after application of the first voltage, application of the first voltage being stopped during the stop time period,
the inverter applies the second voltage after a lapse of the stop time period, and
a timing of transitioning to the normal operation after the lapse of the stop time period is determined based on a detected value from the current detector.

13. The motor driving apparatus according to claim 12, wherein
a lower limit of the stop time period is determined based on a motor constant of the single-phase motor or a rotation speed of the single-phase motor at startup.

14. The motor driving apparatus according to claim 12, wherein
an upper limit of the stop time period is determined based on inertia of a load connected to the single-phase motor.

15. The motor driving apparatus according to claim 12, wherein
the first voltage is a voltage pulse train having a pulsed shape.

16. The motor driving apparatus according to claim 15, wherein
the voltage pulse train is a fixed-width voltage pulse train.

17. The motor driving apparatus according to claim 15, wherein the voltage pulse train having a pulsed shape is generated based on a carrier and a voltage command.

18. The motor driving apparatus according to claim 12, wherein the inverter includes a plurality of switching elements that are bridge-connected, and at least one of the plurality of switching elements is formed of a wide bandgap semiconductor.

19. The motor driving apparatus according to claim 18, wherein the wide bandgap semiconductor is silicon carbide, gallium nitride, gallium oxide, or diamond.

20. An electric blower comprising the motor driving apparatus according to claim 12.

21. A vacuum cleaner comprising the electric blower according to claim 20.

22. A hand dryer comprising the electric blower according to claim 20.

\* \* \* \* \*